United States Patent
Pfalzgraf et al.

(10) Patent No.: US 6,652,022 B2
(45) Date of Patent: Nov. 25, 2003

(54) MOTOR VEHICLE ROOF WITH TWO MOVABLE COVERS

(75) Inventors: Manfred Pfalzgraf, Herrsching (DE); Walter Schätzler, Starnberg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/085,622

(22) Filed: Mar. 1, 2002

(65) Prior Publication Data

US 2002/0163227 A1 Nov. 7, 2002

(30) Foreign Application Priority Data

Mar. 1, 2001 (DE) .......................................... 101 10 012

(51) Int. Cl.[7] ................................................ B60J 7/047
(52) U.S. Cl. ............................. 296/220.01; 296/216.03; 296/216.05
(58) Field of Search ........................... 296/216.01, 219, 296/220.01, 222, 216.02, 216.03, 216.04, 216.05

(56) References Cited

U.S. PATENT DOCUMENTS

2002/0125743 A1 * 9/2002 Bohm et al. ............ 296/216.04
2003/0011215 A1 * 1/2003 Arnold et al. ............... 296/223

FOREIGN PATENT DOCUMENTS

| DE | 38 02 380 A1 | 8/1988 |
| DE | 44 15 649 C1 | 6/1995 |
| DE | 197 13 347 C1 | 5/1999 |
| DE | 298 20 613 U1 | 3/2000 |

* cited by examiner

*Primary Examiner*—Dennis H. Pedder
*Assistant Examiner*—Jason Morrow

(57) ABSTRACT

A motor vehicle roof (1) with a front cover (2) a rear edge that is pivotally supported on a slide element (6) which can be moved along a guide (7), and with a rear cover (3) which borders the front cover (2) and which has a rear edge which is pivotally mounted. A high degree of flexibility in the opening possibilities with simultaneously stable guidance of the covers (2, 3) is achieved by the rear cover (3) having guides (11) for guiding the rear slide element (8) of the front cover (2) when the front cover is slid rearward.

9 Claims, 1 Drawing Sheet

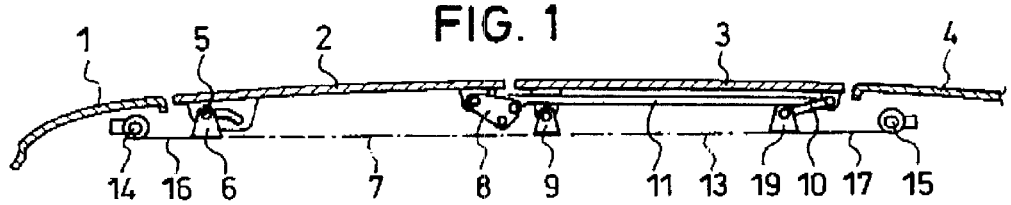
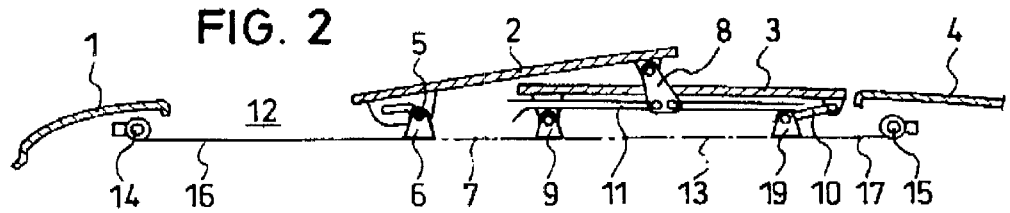
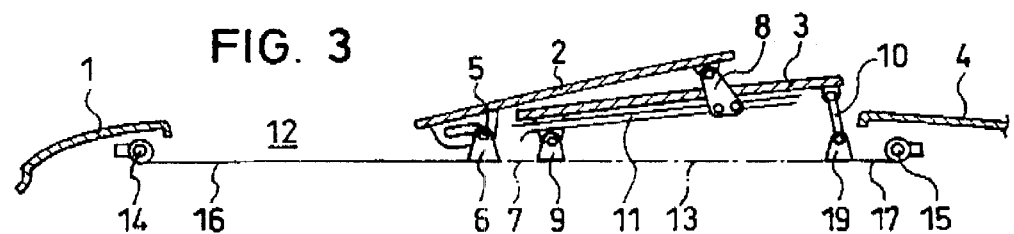
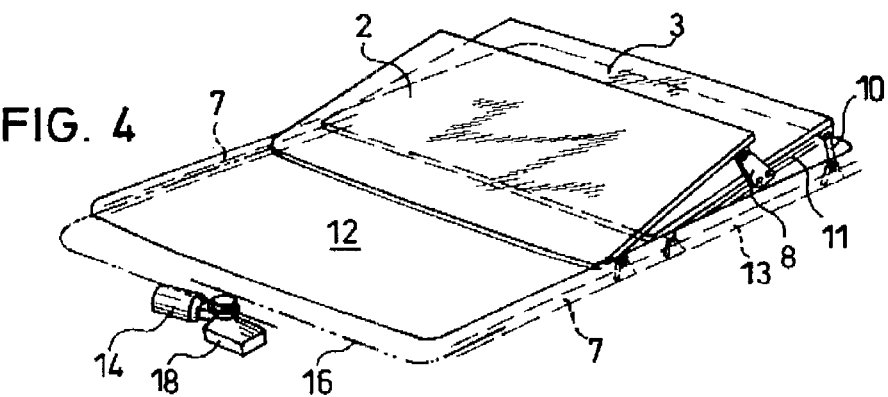

MOTOR VEHICLE ROOF WITH TWO MOVABLE COVERS

BACKGROUND OF THE INVENTION

1. Field of the Invention

The invention relates to a motor vehicle roof with two movable covers, a front cover which is pivotally supported at its rear edge on a slide element which can be moved along a guide, and a rear cover which borders the front cover and which is pivotally mounted.

2. Description of Related Art

Published German Patent Application DE 197 13 347 A1 discloses an openable motor vehicle roof in which the front cover can be raised at its rear edge above the fixed motor vehicle roof and can be moved by means of rear support levers on slide elements in guides at either side of the fixed rear cover plate. The disadvantage in such a motor vehicle roof is that only the front cover can be pivoted into the ventilator position, while there is no draft-free ventilation possibility for the rear vehicle passengers due to the fixed rear cover.

Published German Patent Application DE 38 02 380 A1 discloses a motor vehicle roof with two covers, both of which can be raised at their rear edge and can be moved as spoiler covers to clear the roof opening. These spoiler covers generally have the disadvantage that the covers are supported only roughly in the front third. Therefore, these roofs are of only limited suitability for motor vehicles with a high top speed.

SUMMARY OF THE INVENTION

The primary object of the present invention is to devise a motor vehicle roof which enables highly variable ventilation possibilities with the covers being guided in stable manner.

This object is achieved by the rear cover having guides for guiding the rear slide element of the front cover.

In contrast to the initially mentioned published German Patent Application DE 197 13 347 A1, the invention has the advantage that the rear cover is, likewise, a movable cover with a rear edge that can be swung upward, so that there are also good ventilation possibilities for passengers in the rear area of the vehicle interior. Stable support of the front cover and the two covers traveling compactly over one another, and with clearance of a correspondingly large roof opening, are enabled by the rear cover having guides for guiding the rear slide element of the front cover.

Preferably the rear slide element of the front cover enters the guide on the rear cover only when the front cover is moved to the rear.

There are different possibilities for execution of the rear cover. The rear cover can be movable in the manner of an externally guided sliding roof or a spoiler roof along roof-mounted guides above the rear part of the fixed motor vehicle roof; it can, on the other hand, also be movable in the manner of a sliding-lifting roof underneath the rear part of the fixed motor vehicle roof. In any case, its rear edge can be swung out into a ventilator position.

The front cover can be moved, especially preferably, also when the rear cover with its rear slide element has been pivoted and/or displaced in its guides.

Preferably, the front cover and the rear cover can be moved independently of one another, at least for the most part. Only when the two covers are located in the raised position in which one cover has been partially moved over the other does it make sense for the pivoting motion of the covers out of this position to take place synchronously.

The front cover and the rear cover can each be advantageously moved by a motorized drive, especially an electric motor. The two drives are preferably triggered by a common control device which, depending on the respective position of the two covers, allows certain movements of the drives and blocks other movements. In this way, blockages and damage to the mechanism can be effectively prevented.

One embodiment of a motor vehicle roof in accordance with the invention is explained in detail below with reference to the accompanying drawings.

BRIEF DESCRIPTION OF THE DRAWINGS

FIG. 1 is a schematic lengthwise section through the motor vehicle roof in the closed position;

FIG. 2 is a lengthwise section as shown in FIG. 1 with the front cover raised and partially moved to the rear, FIG. 3 is a lengthwise section as shown in FIG. 2 with the rear cover raised and FIG. 4 is a schematic perspective view of the motor vehicle roof with the raised covers moved over one another.

DETAILED DESCRIPTION OF THE INVENTION

In the fixed motor vehicle roof 1, there is a large roof opening 12 which can be closed or at least partially cleared by means of two successive covers 2, 3. The front cover 2 is pivotally coupled by a pivot axis 5 to the front slide elements 6 so that it can be raised at its rear edge above the fixed motor vehicle roof 1 into a ventilator position. The raising motion is produced by the rear slide elements 8 which are part of a mechanism which has raising and support levers which are not shown in detail, but are as known from the initially mentioned published German Patent Application DE 197 13 347 A1. In the closed position shown in FIG. 1, the front slide elements 6 and the rear slide elements 8 are movably supported along schematically shown guides 7.

The rear cover 3 is pivotally coupled near its front edge to the front slide elements 9 by means of a pivot axle. By means of a raising mechanism 10, the rear cover 3 can be raised at its rear edge above the fixed motor vehicle roof 1. The rear cover 3 adjoins the rear part 4 of the fixed motor vehicle roof 1. Depending on the embodiment, the rear cover 3 can be made as a lifting roof which can only pivot upward into the ventilator position shown in FIG. 3 or can assume the closed position shown in FIG. 1. However, the rear cover 3 can also be made in the manner of a spoiler roof or an externally guided sliding roof (like the front cover in published German Patent Application DE 197 13 347 A1), and in its raised position can be moved to the rear along guides 13 above the part 4 of the fixed motor vehicle roof 1. Finally, the rear cover 3 can also be made in the manner of a sliding and lifting roof so that it can be lowered with its rear edge in addition to the ventilator position shown in FIG. 3 and can be moved to under the part 4 of the fixed motor vehicle roof 1.

The particular feature of this invention is that on the rear cover 3 there are guides 11 which are used to hold the rear slide elements 8 of the front cover 2 when the latter is moved to the rear. The rear slide elements 8 are accommodated in the guides 11 regardless of in what position the rear cover 3 is located. As shown in FIG. 2, it can be in its closed position so that the roof opening 12 is partially cleared only in the forward area by the front cover 2. In the transition from FIG. 1 to FIG. 2, the raising levers on the rear slide element 8 have been raised so that the rear edge of the front cover 2 is raised. Furthermore, the rear slide elements 8, at the junction between the two covers 2, 3 are moved out of the guide 7 into the guide 11 so that the back end of the front cover 2 is now supported by the slide elements 8 and the guides 11 on the rear cover 3. The guides 11 can be widened in a funnel-shape to facilitate entry of the slide elements 8 on their front ends.

Regardless of the position of the front cover 2, proceeding from the closed position as shown in FIG. 1, the rear cover 3 with its rear edge can be raised into the ventilator position, as is shown in FIG. 3. This raising motion can also take place when the front cover 2 has assumed the open position shown in FIG. 2. The front cover 2 can likewise be moved forward or backward regardless of the position of the rear cover 3. Thus, the front cover 2 can be moved, for example, out of the open position shown in FIG. 3 into its closed position as shown in FIG. 1, without the rear cover 3 being lowered from its ventilator position. Finally, the two covers 2, 3 can also be moved in the position shown in FIG. 3 in a package along the guides 7, 13 in the roof opening 12 so that partial openings of different sizes can be set forward and backward.

The front cover 2 is connected via a drive cable 16 to a drive 14 which is made preferably as an electric motor and is located under the front part of the fixed motor vehicle roof 1. The drive cable 16 is guided stiffly in tension and compression in the guide channels which are located parallel to the guides 7, 13. It is attached to the rear slide element 8 and causes the raising motion of the raising lever and the displacement of the slide elements 8 in the guides 7, 11.

The rear cover 3 is connected via a drive cable 17 to a drive 15 which is made preferably as an electric motor and is located under the rear part 4 of the fixed motor vehicle roof 1. The drive cable 17 is guided stiffly in tension and compression in the guide channels which are parallel to the guides 7, 13. It is attached to the raising mechanism 10 and causes the raising motion of the raising lever and the displacement of the rear slide elements 19 which are connected to the raising mechanism 10 in the guides 13, 7.

A control device 18, which is located in this embodiment adjacent to the front drive 14, receives control signals from controls, such as selector dials or switches (not shown) and with which the users choose the desired positions of the covers 2, 3, and position signals which correspond to the respective positions of the covers. The control device 18 coordinates the movements of the drives 14, 15 such that collisions or damage to the mechanism cannot occur. Depending on the vehicle type, the control device 18 can also exclude certain cover positions in which disadvantageous wind noise could arise. For example, the position sensors can be place in the path of the covers 2, 3, drive cables 16, 17 or a part connect thereto for detecting and outputting a position signal when each of the covers is in a specific position. Alternatively, the drive shaft or pinion of the drive motor 14 or the drive cables themselves can operate on a potentiometer or equivalent device can continuously monitor the positions of the covers 2, 3. In this way, the control device 18 can prevent stopping of the drive to prevent stopping of the covers in an undesirable position or can stop the drive when a cover reaches the position selected by the user with controls.

The guides 11 are located preferably underneath the rear cover 3 near its outside edges such that the slide elements 8 fit laterally from the outside into their guide paths. To do this, it is advantageous if the front slide element 9 of the rear cover 3 is located somewhat farther inside so that it is located outside the path taken by the slide element 8 when the front cover 2 is moved to the rear. The slide elements 8 preferably have guide elements to the inside and outside, such as rollers or slide pins, of which those pointed to the inside engage the guides 11 on the rear cover 3 and those pointed to the outside engage the roof-mounted guides 7. The roof-mounted guides 7, accordingly, on their tops, have passage possibilities for the guide elements which are pointed to the outside so that they can leave the guides 7 as soon as the guide elements pointed to the inside engage the guides 11.

Instead of using two drives 14, 15, actuation of the covers 2, 3 is also possible by means of a single common drive. The latter is then drive-connected via a drive cable and elements which can be coupled and uncoupled, for example, with automatically coupling locking blocks, depending on the desired sequence of the opening and closing motion of the two covers 2 or individually or simultaneously with the slide elements 8, 19. The independence of the actuation of the two covers and the diversity of versions of the opening possibilities are limited in this embodiment in favor of a more economical approach. In one especially economical version the covers can also be manually adjusted without departing from the core idea of the invention.

We claim:

1. Motor vehicle roof with a front cover having a rear edge pivotally supported on a rear slide elements which can be moved along a guide, and a rear cover which borders the front cover and which is mounted so as to be pivotable; wherein the rear cover has guides for guiding the rear slide element of the front cover; and wherein the guides on the rear cover are arranged to enable the rear slide elements of the front cover to enter therein only when the front cover is moved to the rear.

2. Motor vehicle roof as claimed in claim 1, wherein the pivotable mounting of the rear cover enables the rear cover to be swung up at a rear edge thereof by a raising mechanism.

3. Motor vehicle roof as claimed in claim 2, wherein the front cover is also movable along the guides when the rear cover has been swung up out of a closed position.

4. Motor vehicle roof as claimed in claim 3, wherein the front cover and the rear cover are movable independently of one another.

5. Motor vehicle roof as claimed in claim 1, wherein the front cover and the rear cover are movable independently of one another.

6. Motor vehicle roof as claimed in claim 1, wherein the front cover and the rear cover, in a raised position in which the front cover is moved partially over the rear cover, are movable synchronously toward a rear of the motor vehicle roof.

7. Motor vehicle roof as claimed in claim 1, wherein the front cover and the rear cover are each movable by a respective motorized drive.

8. Motor vehicle roof as claimed in claim 7, wherein the drive for the front cover and the drive for the rear cover are triggered by a common control device which, depending on the respective position of the two covers, allows certain movements of the drives and blocks other movements.

9. Motor vehicle roof as claimed in claim 1, wherein the guides on the rear cover are located underneath the rear cover lateral outside edges thereof.

* * * * *